United States Patent
Huang et al.

(10) Patent No.: US 11,063,824 B2
(45) Date of Patent: Jul. 13, 2021

(54) PEER-TO-PEER NETWORK BOOST SYSTEM

(71) Applicant: FORGAMERS INC., Taipei (TW)

(72) Inventors: Chih-Jen Huang, Taipei (TW); Yu-Hsiang Wu, Taipei (TW)

(73) Assignee: FORGAMERS INC., Taipei (TW)

( * ) Notice: Subject to any disclaimer, the term of this patent is extended or adjusted under 35 U.S.C. 154(b) by 0 days.

(21) Appl. No.: 16/818,684

(22) Filed: Mar. 13, 2020

(65) Prior Publication Data
US 2020/0295989 A1  Sep. 17, 2020

(30) Foreign Application Priority Data
Mar. 14, 2019 (TW) .................. 108108694

(51) Int. Cl.
*H04L 12/24* (2006.01)
*H04L 29/08* (2006.01)
*A63F 13/34* (2014.01)

(52) U.S. Cl.
CPC ............ *H04L 41/083* (2013.01); *A63F 13/34* (2014.09); *H04L 67/104* (2013.01); *H04L 67/1042* (2013.01); *H04L 67/1053* (2013.01); *H04L 67/1074* (2013.01); *H04L 67/18* (2013.01); *A63F 2300/408* (2013.01); *H04L 67/12* (2013.01)

(58) Field of Classification Search
CPC . H04L 41/083; H04L 67/104; H04L 67/1042; H04L 67/1053; H04L 67/1074; H04L 67/12; H04L 67/18; H04L 67/02; H04L 43/16; H04L 45/308; H04L 63/102; H04L 65/60; G06F 16/5866; G06F 21/56; G06N 20/00; G06N 5/025; H04W 24/10; H04W 4/50; H04W 88/04
See application file for complete search history.

(56) References Cited

U.S. PATENT DOCUMENTS

| 8,819,341 B2 | 8/2014 | Sintorn et al. | |
| 2010/0137021 A1* | 6/2010 | Sharret | H04W 88/04 455/550.1 |

(Continued)

FOREIGN PATENT DOCUMENTS

| CN | 102904959 A | 1/2013 |
| CN | 104395640 A | 3/2015 |

(Continued)

*Primary Examiner* — Le H Luu

(57) ABSTRACT

A peer-to-peer (P2P) network boost system for boosting the transmission of specific packets between at least two electronic devices on the internet includes at least one boosting node and a hardware boosting device, wherein the hardware boosting device includes a geographical location judging module, a P2P matching module and a transmitting module. The boosting node is configured for receiving the specific packets and planning the transmitting route of the specific packet. The hardware boosting device judges the specific packets from a plurality of packets sent by the electronic device and sends the specific packets to the others electronic devices through the boosting node. The P2P network boost system achieves the network boosting function and optimizes the transmitting route through the hardware boosting device and the boosting node to improve the connecting quality and reduce the connecting cost.

12 Claims, 7 Drawing Sheets

(56) References Cited

U.S. PATENT DOCUMENTS

| | | | | |
|---|---|---|---|---|
| 2012/0057456 A1* | 3/2012 | Bogatin | ................... | H04W 4/50 |
| | | | | 370/230.1 |
| 2012/0106428 A1* | 5/2012 | Schlicht | ................ | H04L 45/308 |
| | | | | 370/312 |
| 2012/0278500 A1* | 11/2012 | Ganjam | ................... | H04L 65/60 |
| | | | | 709/231 |
| 2014/0188781 A1* | 7/2014 | Fawaz | .................... | G06N 5/025 |
| | | | | 706/59 |
| 2014/0359015 A1* | 12/2014 | Pesavento | ........... | G06F 16/5866 |
| | | | | 709/204 |
| 2015/0223088 A1* | 8/2015 | Niu | ....................... | H04W 24/10 |
| | | | | 370/252 |
| 2017/0046510 A1* | 2/2017 | Chen | ...................... | G06N 20/00 |
| 2018/0039779 A1* | 2/2018 | Li | ............................ | G06F 21/56 |
| 2018/0241727 A1* | 8/2018 | Verzun | ................. | H04L 63/102 |
| 2018/0331935 A1* | 11/2018 | Ross | ....................... | H04L 43/16 |
| 2019/0182903 A1* | 6/2019 | Le | ........................... | H04L 67/02 |

FOREIGN PATENT DOCUMENTS

| | | |
|---|---|---|
| TW | 201004243 A | 1/2010 |
| WO | WO2014040497 A1 | 3/2014 |

* cited by examiner

PEER-TO-PEER NETWORK BOOST SYSTEM

BACKGROUND OF THE INVENTION

1. Field of the Invention

The present invention relates to a peer-to-peer network boost system, especially to a peer-to-peer network boost system for boosting the transmission of specific packets of multiple electronic devices connected in a point-to-point manner.

2. Description of the Prior Art

In recent years, various emerging industries have rapidly grown with full development of the internet technology to the scale like that of the traditional industries. For example, the electronic games now have a great influence on the economy and the society along with full development of the internet technology, and E-sports becomes one of the formal sports. Moreover, the rapid development of the internet extends the scale of the electronic games from the player's surroundings to any network accessible place. It makes players to play games with other players around the world, resulting in the innovation and development of electronic games.

One type of data processing of the on-line electronic games can be performed through one or more game server, and players connect to these game servers for data exchange. However, since the game server is a data transmission intermediary between different players, the game speed would be reduced for the data exchanges of these players need to be executed by the game server. On the other hand, peer-to-peer (P2P) connection is also one of the common game connection methods. Because P2P connection does not need to go through the game server, but the player directly exchanges the game information to other players, the players can quickly play the game and game companies do not need to maintain the game server, thereby reducing maintenance costs. In addition, P2P connecting-type electronic games usually provide a matching server. Players can pair with other players from the matching server, and the player can directly connect with other players to play the game after successful pairing. The electronic game in the form of P2P connection is not limited to two persons connecting to each other, but may also be connecting among multiple persons.

Although P2P connecting-type electronic games do not require data processing and transmission through the game server and then the game speed is improved, they still need to be played via the internet. Therefore, the physical speed limits or the transmission route of data on the internet will affect the performance and game experience of players. In addition, the scale of electronic games can be extended to the whole world through the internet. However, when a player connects with a foreign player at the other end of the world, a higher latency occurs due to the longer distance of the data transmission route on the network, and it will further affect the player's performance and gaming experience. Therefore, how to improve the network speed of P2P games is also one of the problems to be solved.

In the current technology, the method of increasing the network speed of P2P electronic games is to enhance the success rate of player matching. It means to optimize the network of the aforementioned matching server, so that the matching server can find more players and help the players starting the game more quickly. However, this technology is only for optimizing the matching server. The game process between the players after successful pairing has no optimizing effect. The information contained in the P2P packet has no obvious characteristics to indicate that the packet belongs to a game packet, and then it is hard to identify the P2P game packet by the current boost device correctly. Also, because game software only processes packets of the same software or application, the location of the device sending the packet would not be obtained. Therefore, it is hard to use the current network boosting technology to define the location of the device and generate the best route to boost the game speed.

At present, the technologies for obtaining the player's location includes providing the location information by the player himself, detecting the location through a network ISP, and the GPS and GEO modules built in the hardware device. However, the player may provide the wrong location or not provide the location in the above technologies, and the ISP, GPS and GEO services need to pay extra fee, which not only increases the difficulty of routing but also increases the device cost or network cost.

Thus, it is necessary to develop a new peer-to-peer network boosting mechanism that can accurately identify specific packets and generate optimal routes to solve the problems of the prior art.

SUMMARY OF THE INVENTION

Therefore, one category of the present invention is to provide a peer-to-peer (P2P) network boost system for boosting the transmission of the specific packets in the form of peer-to-peer between at least two electronic devices on an internet. In one embodiment of the present invention, the peer-to-peer network boost system includes at least one boosting node and a hardware boosting device. The boosting node is configured on the internet for receiving a plurality of the specific packets sent by the electronic devices, planning the transmitting routes of the specific packets, and sending the specific packets to destinations designated by the specific packets through the transmitting route. The hardware boosting device is configured at a first electronic device of the at least two electronic devices and connects to the internet. The hardware boosting device is configured for receiving a plurality of packets sent by the first electronic device and transmitting the specific packets of the packets to the others electronic devices of the at least two electronic devices. The hardware boosting device further includes a geographical location judging module, a P2P matching module and a transmitting module. The geographical location judging module is configured for judging the geographical location of the hardware boosting device and the first electronic device. The hardware boosting device connects to a first boosting node corresponding to the geographical location of the at least one boosting node through the internet. The P2P matching module is configured for detecting the specific packets of the packets according to a boosting rule. The transmitting module is connected to the P2P matching module. The transmitting module is configured for transmitting the specific packets to the first boosting node on the internet to boost the transmission of the specific packets through the first boost node.

Wherein, the specific packets are P2P game packets.

Wherein, the boosting rule is that when a plurality of packets with a P2P network topology are detected in a particular time over a threshold value of times, the packets with the P2P network topology are the specific packets.

In one embodiment, the hardware boosting device selectively connects to a pairing server on the internet for P2P pairing. Wherein, the boosting rule is that when a large number of packets with the same mode are detected after detecting the hardware boosting device connecting to the pairing server, the packets with the same mode are the specific packets.

Wherein, the P2P matching module is configured for generating a boosting information according to the specific packets, and the transmitting module transmits the boosting information to the first boosting node, the at least one boosting node on the transmitting route, and the destinations of the specific packets for synchronization.

Wherein, the at least one boosting node further includes a packet detecting module to detect whether the at least one boosting node receives the specific packets. The boosting node removes the boosting information when the packet detecting module detects that the boosting node has not received the specific packets for a duration.

Another one category of the present invention is to provide a peer-to-peer network boost method for boosting the transmission of a plurality of specific packets between at least two electronic devices on an internet. The method includes the following steps of: detecting the specific packets from a plurality of packets sent by a first electronic device of the at least two electronic devices according to a boosting rule, wherein the destinations of the specific packets are the others electronic devices of at least two electronic devices; judging a geographical location of the first electronic device; connecting the first electronic device to a first boosting node corresponding to the geographical location through the internet; the first boosting node plans a transmitting route between the at least two electronic devices; and transmitting the specific packets to the destinations designated by the specific packets through the transmitting route.

Wherein, the method further includes the following step of: the at least two electronic devices respectively connect to a pairing server of the internet for P2P pairing, so that the at least two electronic devices connect to each other by P2P pairing.

Wherein, the method further includes the following step of: generating a boosting information according to the contents of the specific packets, the first electronic device and the geographical locations of the others electronic devices of the at least two electronic devices, and transmitting the boosting information to the first boosting node, the others boosting nodes on the transmitting route and the destinations of the specific packets for synchronization.

Wherein, the method further includes the following step of: detecting whether the first boosting node and the others boosting nodes on the transmitting route receive the specific packets, the first boosting node and the others boosting nodes on the transmitting route remove the boosting information when the boosting node has not received the specific packets for a duration.

In summary, the peer-to-peer network boost system of the present invention can achieve the network boosting function and optimize the transmitting routes between the electronic devices by the hardware boosting device and the boosting node. The system not only can improve the connecting quality, but also reduce the connecting cost.

BRIEF DESCRIPTION OF THE APPENDED DRAWINGS

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. In addition, each device in the figure is only used to express its relative position and is not depicted in its actual proportion, which will be described first.

Figure 1:
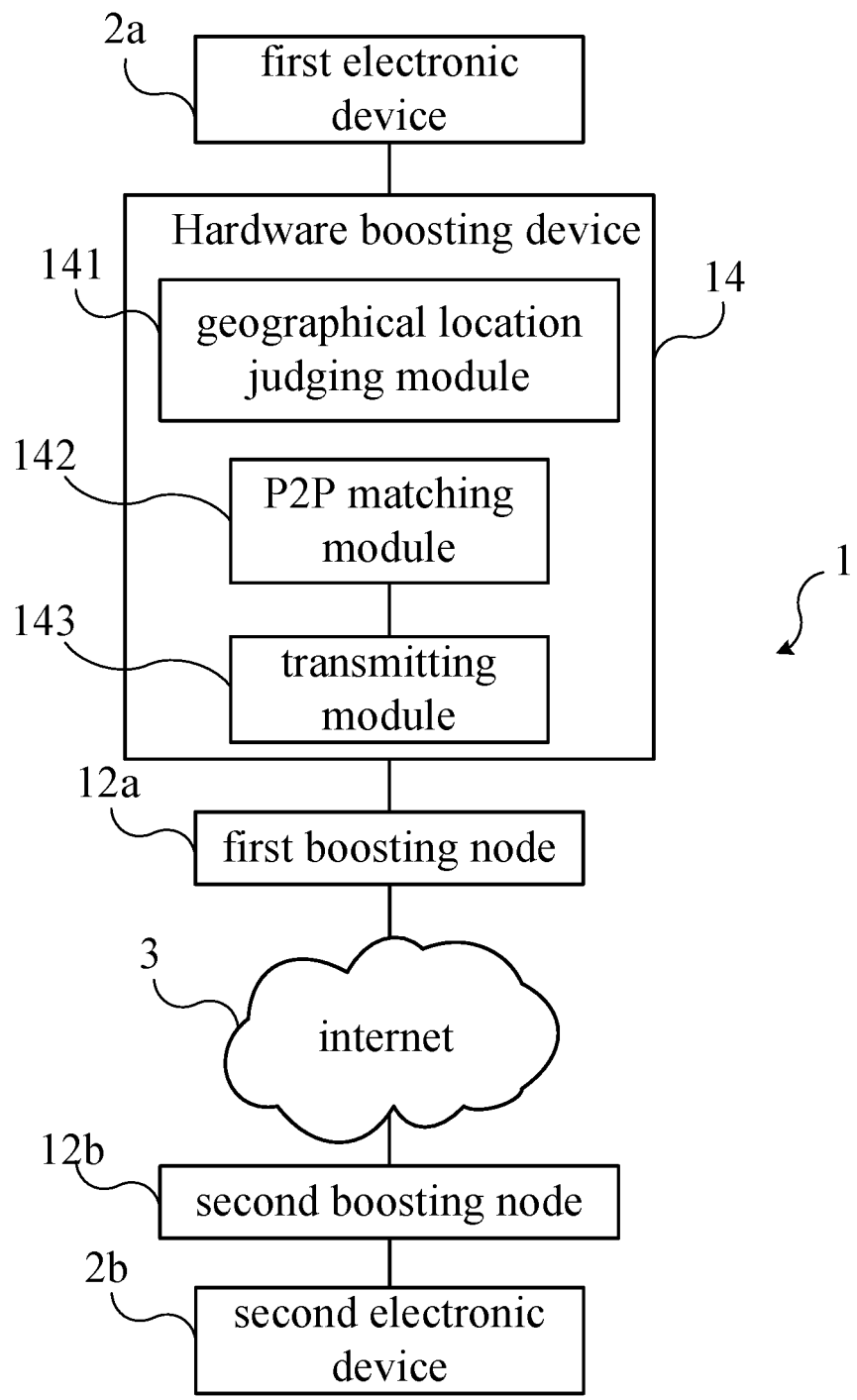
FIG. 1 is a functional block diagram illustrating a peer-to-peer network boost system according to all embodiment of the present invention.

Please refer to FIG. 1. FIG. 1 is a functional block diagram illustrating a peer-to-peer network boost system 1 according to an embodiment of the present invention. The peer-to-peer network boost system 1 can be applied to the peer-to-peer connection between the electronic devices such as a first electronic device 2a and a second electronic device 2b in FIG. 1. In practice, the number of the electronic device is not limited to two, the system can also apply to the plurality of electronic devices which connect to each other in peer-to-peer connection at the same time. As shown in FIG. 1, the peer-to-peer network boost system 1 includes a first boosting node 12a and a second boosting node 12b on the internet 3 and a hardware boosting device 14 configured at the first electronic device 2a. The hardware boosting device 14 can be connected to the internet 3 and the first electronic device 2a to receive the information packets sent by the first electronic device 2a and transmit the information packets to the internet 3. Therefore, the first electronic device 2a can transmit with the second electronic device 2b through the first boosting node 12a, the second boosting node 12b, the hardware boosting device 14 and the internet 3 in peer-to-peer transmission. The first boosting node 12a can be configured for receiving the specific packets transmitted from the hardware boosting device 14 and sent by the first electronic device 2a, planning a transmitting route of the specific packets, and sending the specific packets to a destination (that is the second electronic device 2b) designated by the specific packets through the transmitting route. Thereby, the transmission of the specific packets sent by the first electronic device 2a can be boosted.

In practice, the first electronic device 2a and the second electronic device 2b can be a personal terminal device such as mobile phone, computer or game console. The first boosting node 12*a* and the second boosting node 12*b* can be a boosting server. The hardware boosting device 14 can be a router configured at the first electronic device 2*a* or an additional hardware device attached to the router.

In this embodiment, the hardware boosting device 14 further includes a geographical location judging module 141, a P2P matching module 142 and a transmitting module 143. The P2P matching module 142 can be connected to the transmitting module 143. In practice, the geographical location judging module 141 can be a GPS chip. The P2P matching module 142 can be integrated in the process chip of the hardware boosting device 14. The transmitting module 143 can be a wired or wireless network component, which can be connected to the internet 3 through the wired or wireless manner.

The geographical location judging module 141 can judge the geographical locations of the hardware boosting device 14 and the first electronic device 2*a* to connect the boosting node, that is to say, the hardware boosting device 14 connects to the first boosting node 12*a* corresponding to the geographical location through the internet 3. For example, when the location of the hardware boosting device 14 and the first electronic device 2*a* judged by the geographical location judging module 141 is Taiwan, the hardware boosting device 14 finds the nearest boosting node as the first boosting node 12*a* such as Taiwan boosting server or Southeast Asia boosting server. The first boosting node 12*a* can plan the transmitting route between the first electronic device 2*a* and the second electronic device 2*b*. For example, when the first electronic device 2*a* and the second electronic device 2*b* are located in Taiwan and England respectively, the hardware boosting device 14 connects to the first boosting node 12*a* of Taiwan first. Then, the first boosting node 12*a* plans the transmitting route to the second boosting node 12*b* of the England or Europe. Finally, the second boosting node 12*b* plans the transmitting route to the second electronic device 2*b*. Therefore, the orders of transmission routes of the specific packets sent by the first electronic device 2*a* of Taiwan are the hardware boosting device 14, Taiwan boosting server (the first boosting node 12*a*), England boosting server (second boosting node 12*b*) and the second electronic device 2*b* of England (the second boosting node 12*b*). When the hardware boosting device 14, the first boosting node 12*a* and the second boosting node 12*b* establish the transmitting route between the first electronic device 2*a* and the second electronic device 2*b*, the specific packets sent by the first electronic device 2*a* can be transmitted through the optimized transmitting route, thereby boosting the peer-to-peer transmitting speed between the first electronic device 2*a* and the second electronic device 2*b*.

In practice, the aforementioned first boosting node 12*a* and second boosting node 12*b* are changeable, they are related to the specific packets sent by the first electronic device 2*a*. As described of the prior art, the information contained in the P2P packets has no obvious characteristics to indicate that the packets belongs to the game packets. In other words, the technology of the prior art is hard to detect the specific packets from the packets sent by the first electronic device 2*a*. Moreover, the technology of the prior art also cannot plan the boosting node and the transmitting route to boosting the specific packets.

Please refer to FIG. 1. In this embodiment, the P2P matching module 142 of the hardware boosting device 14 can detect the P2P packets sent by the first electronic device 2*a* to identify the specific packets according a boosting rule. In practice, the specific packets can be the P2P game packets sent by the game program executed by the first electronic device 2*a*. In this embodiment, the boosting rule is that when the packets with a P2P network topology are detected in a particular time over a threshold value of times, the packets with the P2P network topology are the specific packets. In practice, the P2P games are not limited to the interconnection between two players or two electronic devices, but can also be interconnections between multiple people. It will form a mesh-like network topology when the P2P game is interconnected between multiple people. The aforementioned P2P network topology also includes Mesh network topology.

When the P2P matching module 142 of the hardware boosting device 14 detects the specific packets sent by the first electronic device 2*a* which executing the P2P network game, the hardware boosting device 14 seeks and connects the first boosting node 12*a*, and the first boosting node 12*a* plans the transmitting route to the second electronic device 2*b* according to the specific packets.

The aforementioned boosting rule is for the packets, which have begun to perform peer-to-peer transmission, and also can automatically determine whether the first electronic device 2*a* is playing a P2P game and boost the specific packets. However, the boosting rule of the present invention is not limited thereto.

Figure 2:
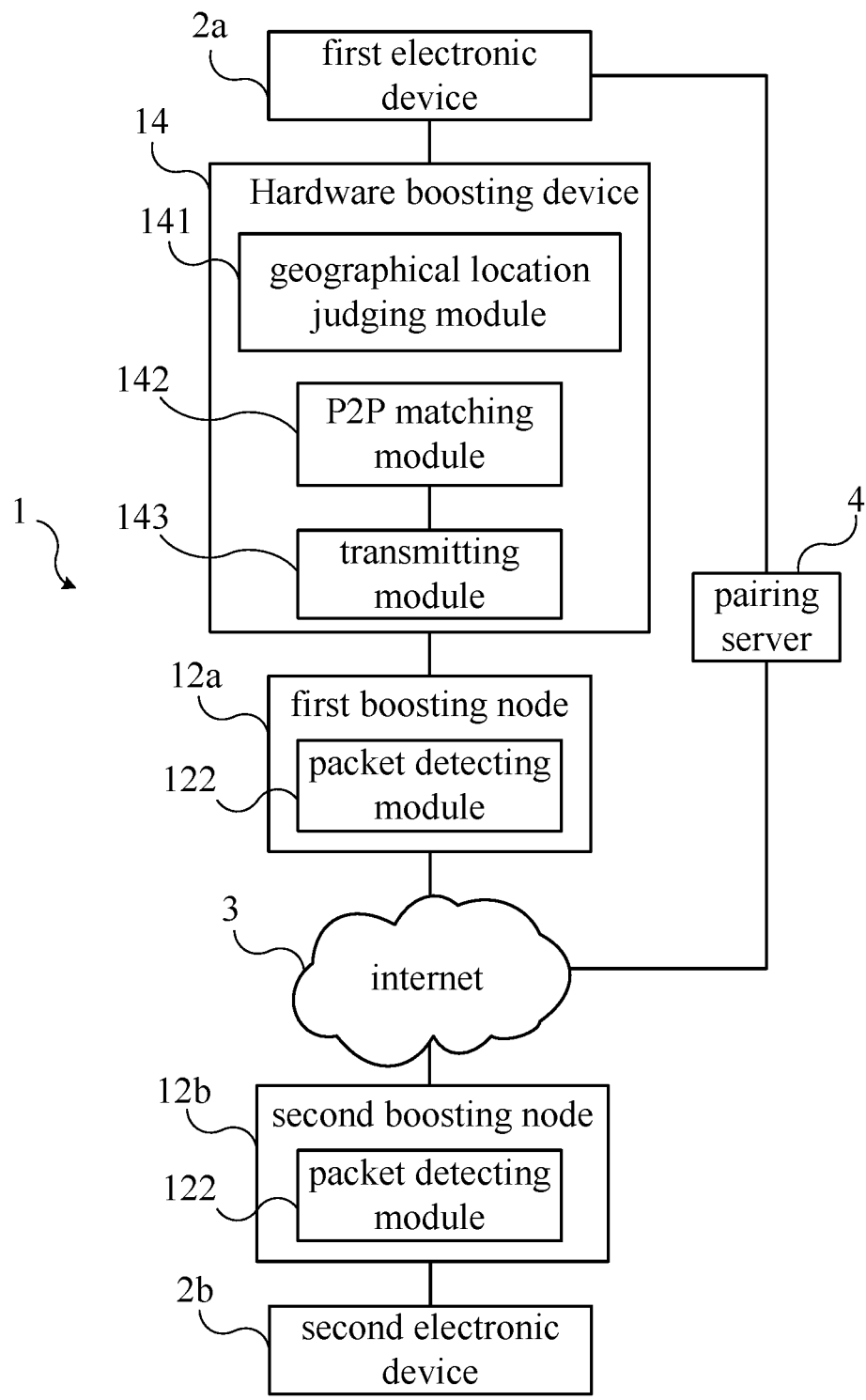
FIG. 2 is a functional block diagram illustrating the peer-to-peer network boost system according to another embodiment of the present invention.

Please refer to FIG. 2. FIG. 2 is a functional block diagram illustrating the peer-to-peer network boost system 1 according to another embodiment of the present invention. As shown in FIG. 2, in this embodiment, the first electronic device 2*a* and the second electronic device 2*b* can connect to the pairing server 4 on the internet 3 for P2P pairing first, and then they connect to each other by P2P connection. At this time, the packet transmission between the first electronic device 2*a* and the second electronic device 2*b* does not pass through the pairing server 4. In practice, both of the first electronic device 2*a* and the second electronic device 2*b* are installed the same application program or software (such as the same game program), so that the first electronic device 2*a* and the second electronic device 2*b* have priority to connect to the pairing server 4 during executing the application program or software.

In this embodiment, the boosting rule is that when a large number of packets with the same mode are detected after detecting the first electronic device 2*a* connecting to the pairing server 4 (for example, the first electronic device 2*a* transmits the plurality packets to the second electronic device 2*b* or the others electronic devices), the packets with the same mode are the specific packets. Therefore, the peer-to-peer network boost system 1 of the present invention can also start to boost the packet transmission after pairing.

When the transmitting route between the first electronic device 2*a* and the second electronic device 2*b* is established through the peer-to-peer network boost system 1, the transmitting module 143 of the hardware boosting device 14 can transmit the plurality of specific packets to the destinations by the transmitting route.

Figure 3:
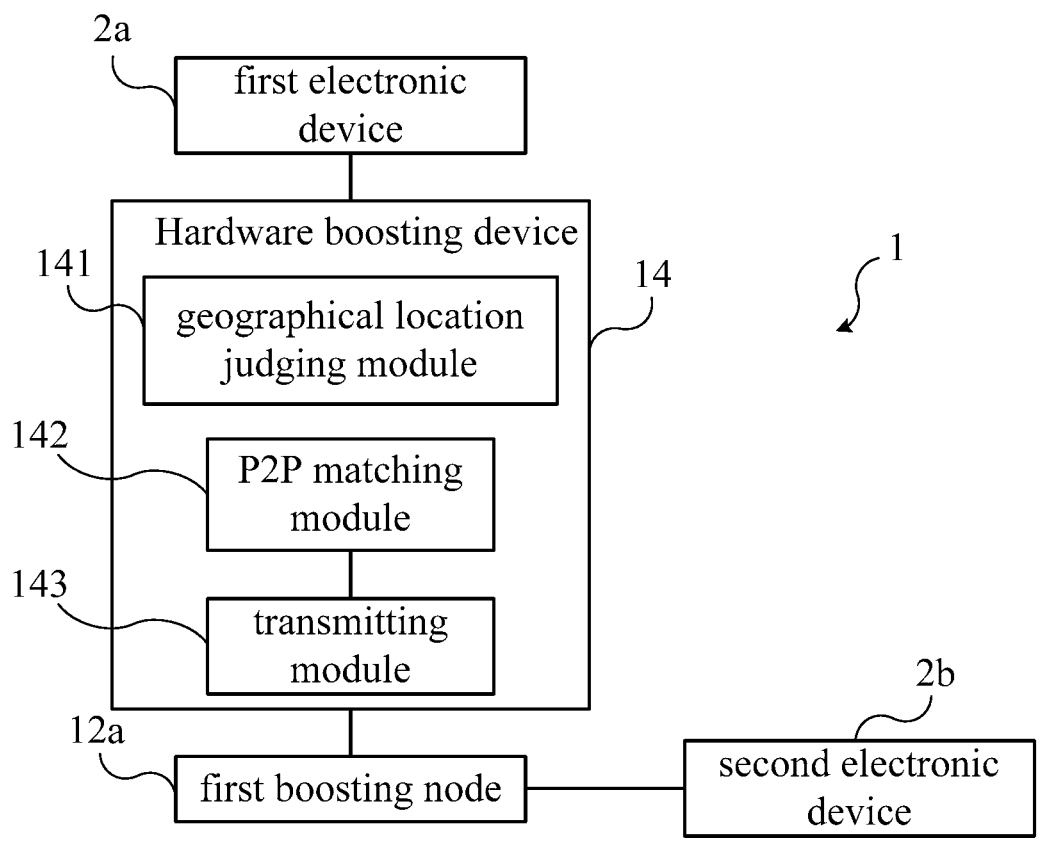
FIG. 3 is a functional block diagram illustrating the peer-to-peer network boost system according to another embodiment of the present invention.
Figure 4:
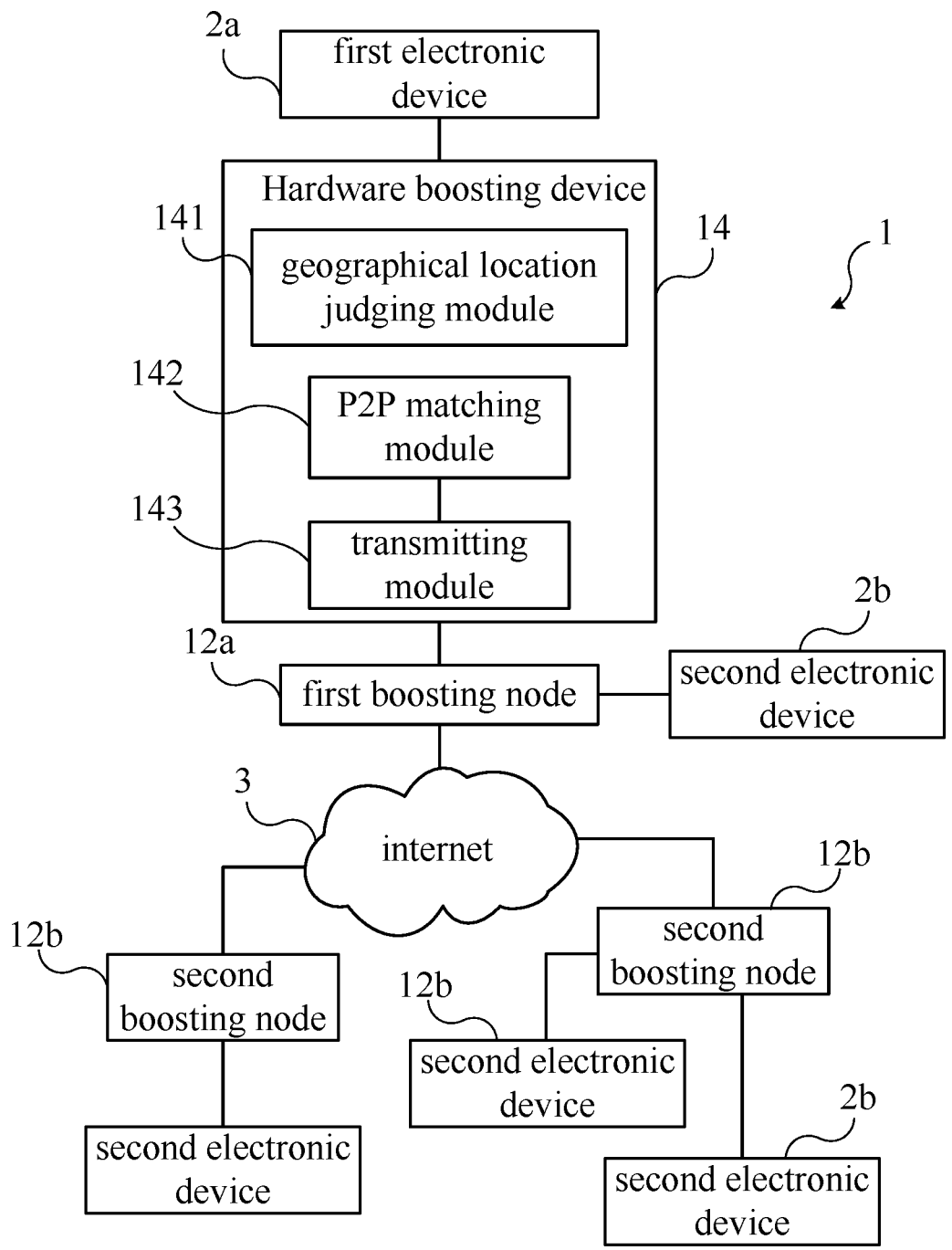
FIG. 4 is a functional block diagram illustrating the peer-to-peer network boost system according to another embodiment of the present invention.

Please refer to FIG. 3 and FIG. 4. FIG. 3 is a functional block diagram illustrating the peer-to-peer network boost system 1 according to another embodiment of the present invention. FIG. 4 is a functional block diagram illustrating the peer-to-peer network boost system 1 according to another embodiment of the present invention. As shown in FIG. 3, the difference between this embodiment and the aforementioned embodiment is that the peer-to-peer network boost system 1 of this embodiment only has one boosting node between the first electronic device 2*a* and the second electronic device 2*b*, which is the first boosting node 12*a*.

When the first electronic device 2a and the second electronic device 2b are located at the same or close region such as Taiwan, the system can rely on the boosting node located in Taiwan to establish the transmitting route. As shown in FIG. 4, the difference between this embodiment and the aforementioned embodiment is that the first boosting node 12a of the peer-to-peer network boost system 1 of this embodiment can provide the transmitting route to the first electronic device 2a and the second electronic device 2b located at the same region. The system also can provide the transmitting route to the first electronic device 2a and the plurality of the second electronic device 2b located at different regions by the first boosting node 12a and the second boosting node 12b simultaneously.

Please refer to FIG. 2. In one embodiment, when the transmitting route is established, the P2P matching module 142 of the hardware boosting device 14 can generate a boosting information according to the contents of the specific packets, the geographical locations and IP addresses of the first electronic device 2a and the second electronic device 2b and the geographical locations and IP addresses of the first boosting node 12a and the second boosting node 12b etc., and the hardware boosting device 14 transmits the boosting information to the first boosting node 12a, the second boosting node 12b and the destination (that is the second electronic device 2b) designated by the specific packets through the transmitting module 143 and the internee 3 for synchronization. For example, when the first electronic device 2a and the second electronic device 2b are located in Taiwan and America respectively and the orders of the transmitting routes are electronic device of Taiwan (the first electronic device 2a), boosting server of Taiwan (the first boosting node 12a), boosting server of America (the second boosting node 12b) and electronic device of America (the second electronic device 2b), the P2P matching module 142 of the hardware boosting device 14 generates the boosting information according to the contents of the specific packets sent from the electronic device of Taiwan, the electronic device located in Taiwan, the electronic located in America, the first boosting node 12a and the second boosting node 12b. That is to say, the boosting information is recorded the data of the whole transmitting routes. In practice, the boosting information can include the IP address of each electronic device, the transmitting route data of each electronic device and so on. Furthermore, the hardware boosting device 14 transmits the boosting information of the electronic device of Taiwan to each of the boosting servers on the transmitting route and electronic device of America to confirm the transmitting route of the specific packets, and each of the boosting servers transmits the specific packets to the destination according to the boosting information.

In another one embodiment, the first electronic device 2a and the second electronic device 2b are connected through the pairing server 4 in P2P manner. At this time, the hardware boosting device 14 connected to the first electronic device 2a can identify the IP address of the second electronic device 2b by the pairing server 4, thereby generating the boosting information rapidly. Then, each of boosting nodes transmits the specific packets of the first electronic device 2a to the second electronic device 2b according to the boosting information. The transmission manner between the first electronic device 2a and the second electronic device 2b is the same as that of the aforementioned embodiment, and will not be described herein.

In one embodiment, both of the first boosting node 12a and the second boosting node 12b include a packet detecting module 122 for detecting whether the first boosting node 12a and the second boosting node 12b receive the specific packets. The first boosting node 12a and the second boosting node 12b remove the boosting information stored in the first boosting node 12a and the second boosting node 12b respectively when the packet detecting module 122 detects that the first boosting node 12a and the second boosting node 12b have not received the specific packets for a duration. For example, the first electronic device 2a connects and executing game with the second electronic device 2b, the first electronic device 2a will rematch to the others electronic devices when the player of the first electronic device 2a wants to play the game again after finishing the game. However, the reconnected electronic device may be different with the previous connected electronic device. It means that the boosting information of the reconnected electronic device will be different with the previous connected electronic device and the second electronic device 2b and the second boosting node 12b of the last time will not receive the game packets. Therefore, when the packet detecting modules 122 of the first boosting node 12a and the second boosting node 12b have not received the specific packets related to the boosting information between the first electronic device 2a and the second electronic device 2b for a duration (such as 10 minutes), the first boosting node 12a and the second boosting node 12b remove the boosting information stored in the first boosting node 12a and the second boosting node 12b to improve the game connecting quality. It is noticed that the connecting manner between the first electronic device 2a and the second electronic device 2b can also be perform through the pairing server 4.

Figure 5:
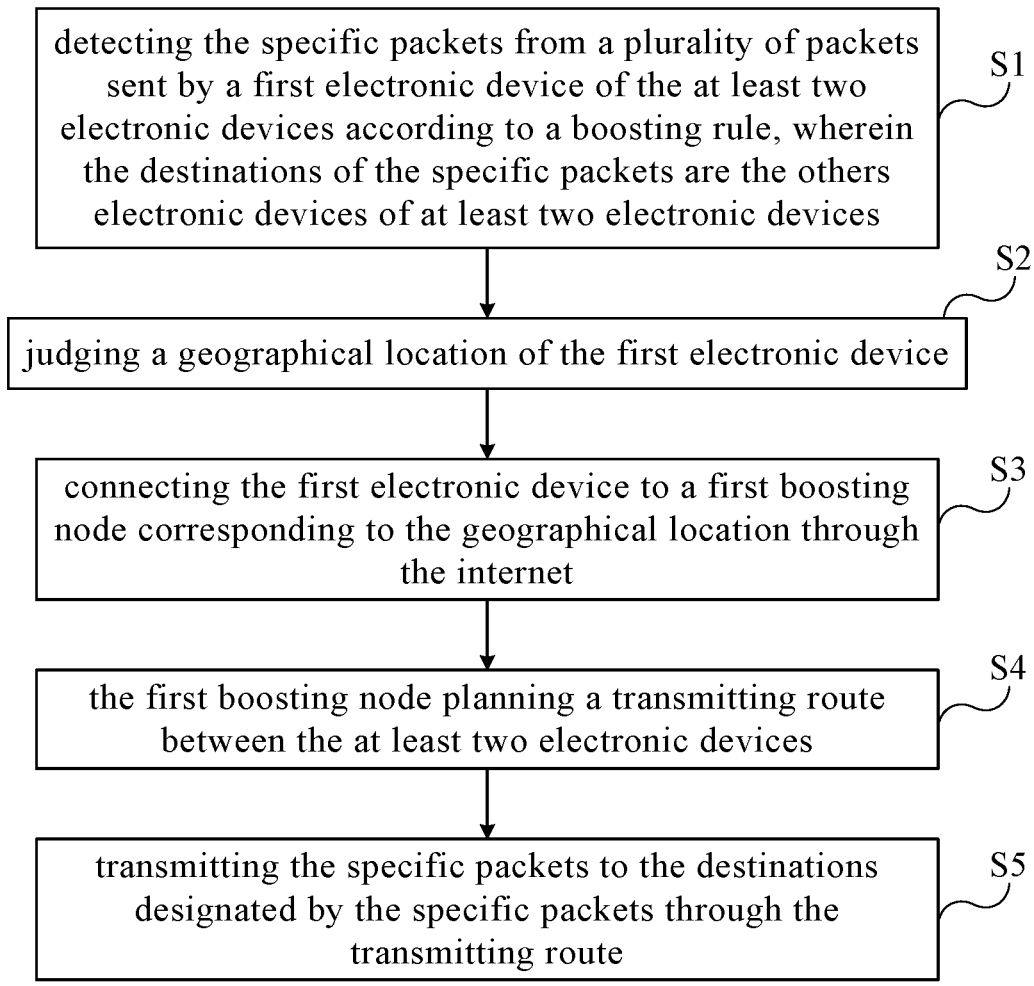
FIG. 5 is a flow diagram illustrating a peer-to-peer network boost method according to an embodiment of the present invention.

Please refer to FIG. 1 and FIG. 5. FIG. 5 is a flow diagram illustrating a peer-to-peer network boost method according to an embodiment of the present invention. As shown in FIG. 5, the peer-to-peer network boost method of this embodiment includes the following steps of: step S1: the P2P matching module 142 of the hardware boosting device 14 detects the specific packets from the packets sent by the first electronic device 2a according to a boosting rule, wherein the destination of the specific packets is the second electronic device 2b; step 2: the geographical location judging module 141 of the hardware boosting device 14 judges the geographical location of the first electronic device 2a; step 3: the hardware boosting device 14 connects to the first electronic device 2a and the first boosting node 12a corresponding to the geographical location of the first electronic device 2a through the internet; step 4: the first boosting node 12a plans the transmitting route between the first electronic device 2a and the second electronic device 2b; and step 5: the transmitting module 143 of the hardware boosting device 14 transmits the specific packets to the second electronic device 2b according to the transmitting route. The judgment manner of the boosting rule of this embodiment is the same as that of the aforementioned embodiments, it will not be described herein.

Figure 6:
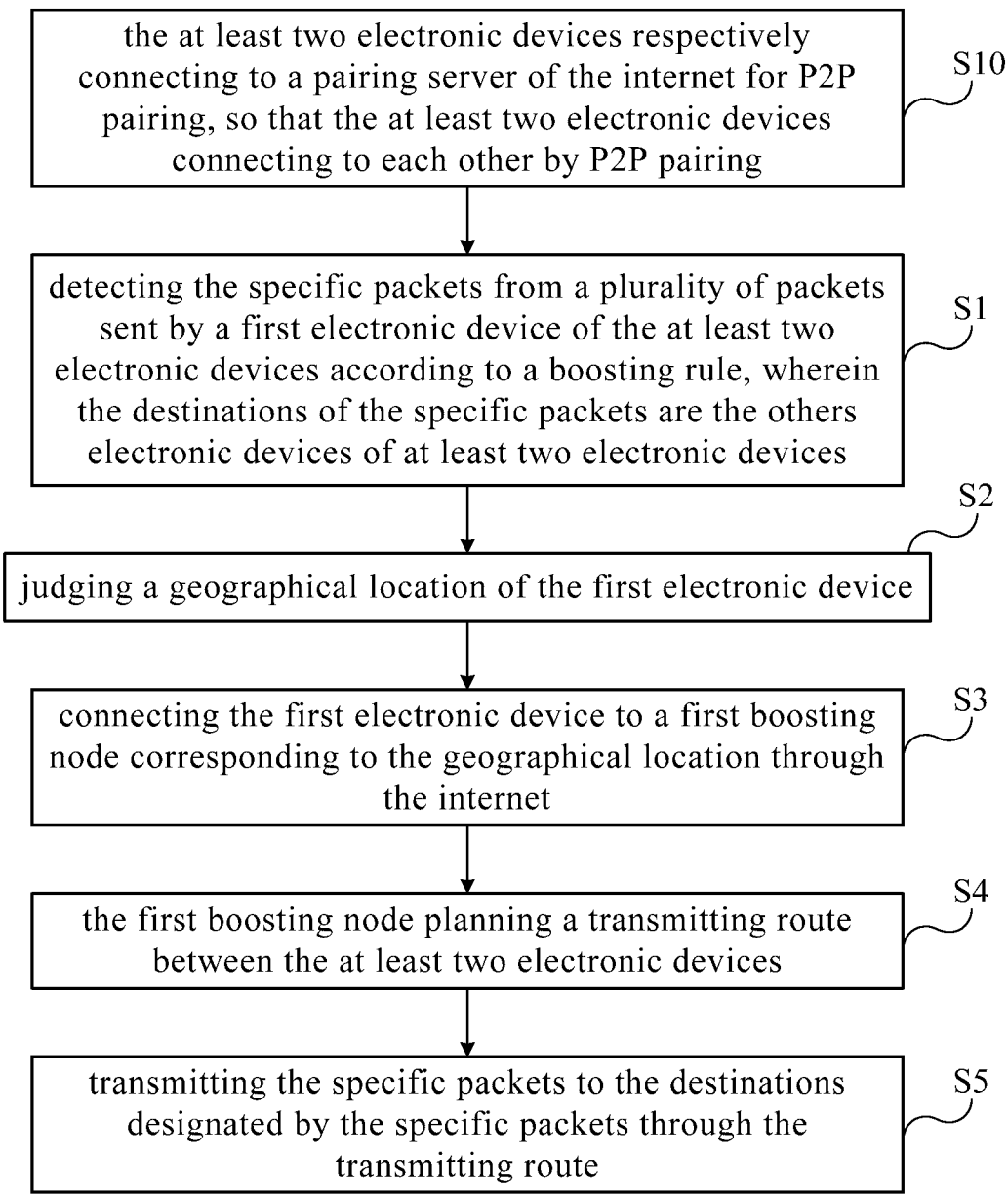
FIG. 6 is a flow diagram illustrating the peer-to-peer network boost method according to another embodiment of the present invention.

Please refer to FIG. 2 and FIG. 6. FIG. 6 is a flow diagram illustrating the peer-to-peer network boost method according to another embodiment of the present invention. In this embodiment, the peer-to-peer network boost method can be executed by the peer-to-peer network boost system 1 of FIG. 2. As shown in FIG. 6, the difference between this embodiment and the embodiment of FIG. 5 is that the method of this embodiment further includes the following step of: step S10: the first electronic device 2a and the second electronic device 2b respectively connect to a pairing server 4 of the internet 3 for P2P pairing, so that the first electronic device 2a and the second electronic device 2b connect to each other by P2P pairing. In addition, the others steps of this embodiment are the same as those of the aforementioned embodiments, and will not be described herein.

Figure 7:
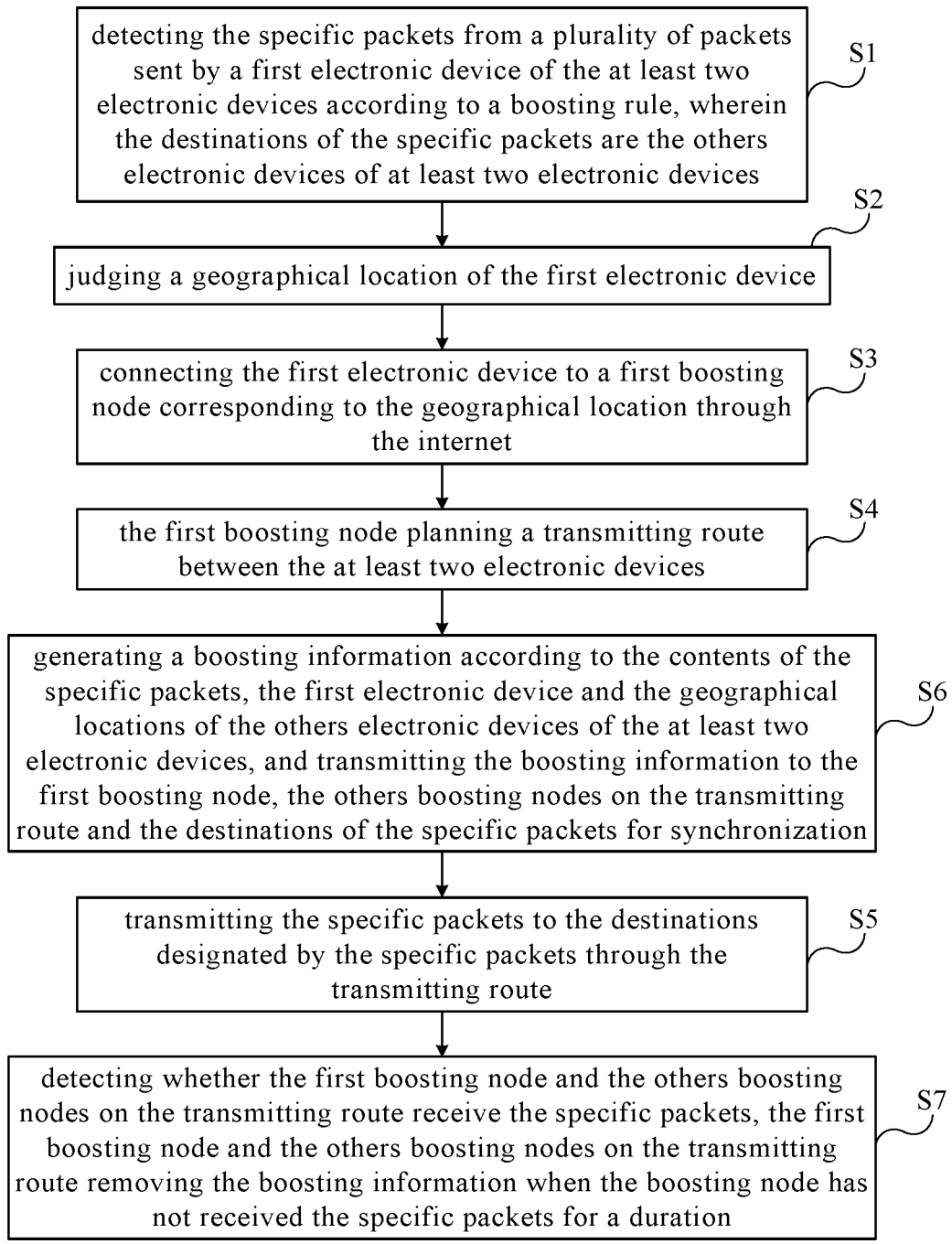
FIG. 7 is a flow diagram illustrating the peer-to-peer network boost method according to another embodiment of the present invention.

Please refer to FIG. 1 and FIG. 7. FIG. 7 is a flow diagram illustrating the peer-to-peer network boost method according to another embodiment of the present invention. In this embodiment, the peer-to-peer network boost method can be executed by the peer-to-peer network boost system 1 of FIG. 1. As shown in FIG. 7, the difference between this embodiment and the embodiment of FIG. 5 is that the method of this embodiment further includes the following steps of: step S6: the hardware boosting device 14 generates a boosting information according to the contents of the specific packets of the first electronic device 2a, the first electronic device 2a and the geographical location of the second electronic device 2b, and transmits the boosting information to the first boosting node 12a, the second boosting node 12b and the second electronic device 2b for synchronization; and step S7: the packet detecting modules 122 of the first electronic device 2a and the second electronic device 2b detect whether the first boosting node 12a and the second boosting node 12b receive the specific packets, the first boosting node 12a and the second boosting node 12b remove the boosting information when the first boosting node 12a and the second boosting node 12b has not received the specific packets for a duration. In addition, the others steps of this embodiment are the same as those of the aforementioned embodiments, and will not be described herein.

In summary, the peer-to-peer network boost system of the present invention can achieve the network boosting function for the specific application programs or electronic devices located at different regions, and can optimize the transmitting routes between the electronic devices by the boosting node. The system not only can improve the connecting quality, but also reduce the connecting cost.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A peer-to-peer (P2P) network boost system configured for boosting the transmission of a plurality of specific packets between at least two electronic devices on an internet, the peer-to-peer network boost system comprising:
at least one boosting node, configured on the internet and configured for receiving the specific packets, planning a transmitting route of the specific packets, and sending the specific packets to destinations designated by the specific packets through the transmitting route; and
a hardware boosting device, configured at a first electronic device of the at least two electronic devices and connected to the internet, the hardware boosting device being configured for receiving a plurality of packets sent by the first electronic device and transmitting the specific packets of the packets to the others electronic devices of at least two electronic devices, the hardware boosting device further comprising:
a geographical location judging module, configured for judging a geographical location of the hardware boosting device and the first electronic device, the hardware boosting device connecting to a first boosting node corresponding to the geographical location of the at least one boosting node through the internet;
a P2P matching module, configured for detecting the specific packets of the packets according to a boosting rule; and
a transmitting module, connected to the P2P matching module, the transmitting module being configured for transmitting the specific packets to the first boosting node on the internet to boost the transmission of the specific packets through the first boost node.

2. The system of claim 1, wherein the specific packets are P2P game packets respectively.

3. The system of claim 1, wherein the boosting rule is that when a plurality of packets with a P2P network topology are detected in a particular time over a threshold value of times, the packets with the P2P network topology are the specific packets.

4. The system of claim 1, wherein the at least two electronic devices selectively connect to a pairing server on the internet for P2P pairing, the boosting rule is that when a large number of packets with the same mode are detected after detecting the hardware boosting device connecting to the pairing server, the packets with the same mode are the specific packets.

5. The system of claim 1, wherein the P2P matching module generates a boosting information according to the contents of the specific packets and the geographical locations of the at least two electronic devices, and the transmitting module transmits the boosting information to the first boosting node, the at least one boosting node on the transmitting route, and the destination designated by the specific packets for synchronization.

6. The system of claim 5, wherein the at least one boosting node further comprises a packet detecting module to detect whether the at least one boosting node receives the specific packets, the boosting node removes the boosting information when the packet detecting module detects that the boosting node has not received the specific packets for a duration.

7. A peer-to-peer (P2P) network boost method for boosting the transmission of a plurality of specific packets between at least two electronic devices on an internet, comprising the following steps of:
detecting the specific packets from a plurality of packets sent by a first electronic device of the at least two electronic devices according to a boosting rule, wherein the destinations of the specific packets are the others electronic devices of at least two electronic devices;
judging a geographical location of the first electronic device;
connecting the first electronic device to a first boosting node corresponding to the geographical location through the internet;
the first boosting node planning a transmitting route between the at least two electronic devices; and
transmitting the specific packets to the destinations designated by the specific packets through the transmitting route.

8. The method of claim 7, wherein the boosting rule is that when a plurality of packets with a P2P network topology are detected in a particular time over a threshold value of times, the packets with the P2P network topology are the specific packets.

9. The method of claim 7, further comprising the following step of:

the at least two electronic devices respectively connecting to a pairing server of the internet for P2P pairing, so that the at least two electronic devices connecting to each other by P2P pairing.

10. The method of claim 9, wherein the boosting rule is that when a large number of packets with the same mode are detected after detecting the hardware boosting device connecting to the pairing server, the packets with the same mode are the specific packets.

11. The method of claim 7, further comprising the following step of:
generating a boosting information according to the contents of the specific packets, the first electronic device and the geographical locations of the others electronic devices of the at least two electronic devices, and transmitting the boosting information to the first boosting node, the others boosting nodes on the transmitting route and the destinations of the specific packets for synchronization.

12. The method of claim 11, further comprising the following step of:
detecting whether the first boosting node and the others boosting nodes on the transmitting route receive the specific packets, the first boosting node and the others boosting nodes on the transmitting route removing the boosting information when the boosting node has not received the specific packets for a duration.

* * * * *